June 4, 1957 — O. E. UECKER — 2,794,244
FLASH WELDING ASSEMBLY AND METHOD
Filed Dec. 24, 1953
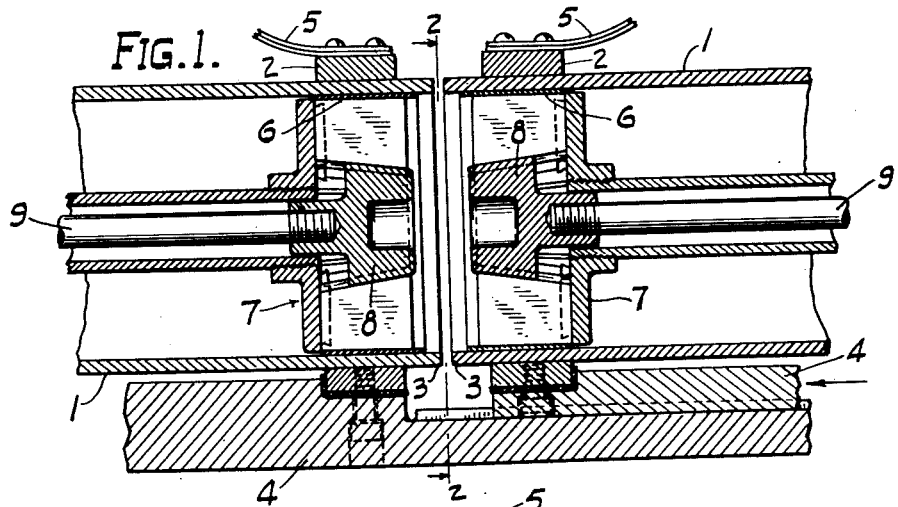
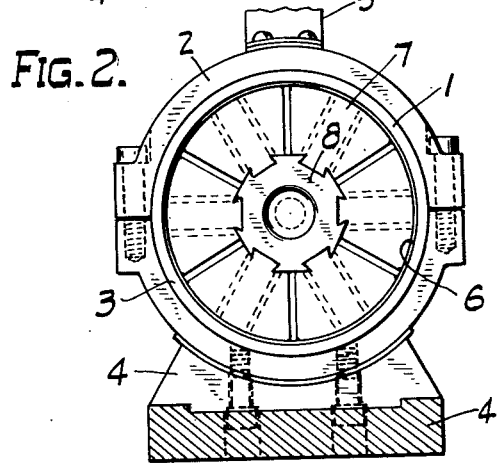
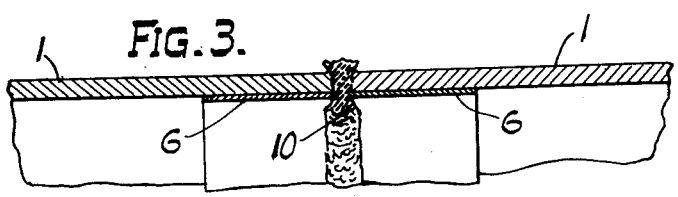
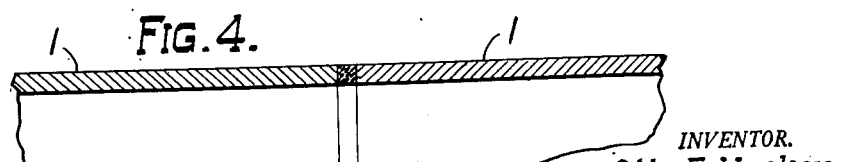
INVENTOR.
Otto E. Uecker
BY
ATTORNEYS.

United States Patent Office 2,794,244
Patented June 4, 1957

2,794,244

FLASH WELDING ASSEMBLY AND METHOD

Otto E. Uecker, Milwaukee, Wis., assignor to A. O. Smith Corporation, Milwaukee, Wis., a corporation of New York Application December 24, 1953, Serial No. 400,328

2 Claims. (Cl. 29—481)

This invention relates to flash welding and more particularly to an assembly for flash welding the opposed edges of two hollow metal members.

When hollow members such as tubes or propeller blades are flash welded, the flash metal extruded from the welded joint on both inside and outside of the member is usually removed to provide the welded article with smooth contours. The flash metal on the outside of the members can generally be removed by filing or grinding without difficulty because the outside flash metal is visible and accessible. The removal of the inside flash metal, however, presents great difficulty because the work area is restricted and difficult to gain access to. Because of these handicaps the inner surfaces of the members bordering the area of the welded joint are often badly gouged and otherwise marred when cleaning out the flash metal by grinding or filing with the result that the members frequently must be scrapped.

The present invention is directed to an assembly to be employed with the hollow metal members to be flash welded which will protect the inner surfaces of the welded members bordering the weld area from disfigurement when the flash metal is removed.

According to the invention, a thin metal shim is disposed against the inner surface of each of the hollow members by a removable fixture at a position outwardly of the edge of the member to be flash welded. During flash welding, the flash metal is extruded at the weld joint between the spaced shims. The shims themselves are partially trapped in the weld so that the shims will remain in place on removal of the fixture. The flash on the inside of the welded members can then be readily ground or chiseled down flush with the exposed surface of the shims without danger of scoring or otherwise marring the inner surface of the members surrounding the welded area. The shims are then removed and the remaining flash is ground out to provide the members with a smoothly contoured interior.

By positioning the shims within the members prior to welding, the shims are partially joined in the weld and thus are conveniently retained in position without external support during the flash removal.

The drawing presented herewith illustrates the best mode presently contemplated of carrying out the invention hereinafter set forth.

In the drawing:

Figure 1 is a sectional view showing hollow articles clamped in position for welding;

Fig. 2 is a transverse section taken along line 2—2 of Figure 1;

Fig. 3 is an enlarged fragmentary view similar to Figure 1 showing the articles after welding and before removal of the flash; and Fig. 4 is a view similar to Fig. 3 showing the articles after flash removal.

Referring to the drawing, the hollow metal articles 1 to be welded are clamped within the welding electrodes 2, as shown in Figure 1, with their respective opposed complementary edge portions 3 aligned for welding. The electrodes 2 are suitably mounted on platens 4 with one or both of the platens being adapted to move toward the other to bring the opposed edges of articles 1 into contact.

Welding potential from a source of potential, not shown, is applied to the electrodes 2 through lead lines 5.

In accordance with the invention a thin metal shim 6 is disposed within each of the articles 1 prior to welding, as shown in Figure 1. Shims 6 are formed with a contour corresponding generally to the internal cross-sectional shape of the articles and are disposed in contacting relation with the inner surface of the articles.

The shims 6 are also located axially inwardly of the respective edges 3 of the articles 1 to be welded at a position where the shims will not interfere with the inward extrusion of the flash metal during welding. Generally, from one-eighth to one-quarter of an inch of metal is consumed by the flashing off of edges 3, so that the positioning of the shims 6 from the edges 3 should compensate for this loss and allow for the extrusion of metal at the joint in the final bump.

The alloy composition of shims 6 depends on the composition of the metal articles to be welded. Generally, the shims should have a composition compatible with the articles and should not contain any elements which may alloy with the molten metal at the weld area to produce undesirable qualities in the weld.

If the articles 1 to be welded are made of steel, the carbon content of the shims should be maintained at a low level so that excessive carbon will not migrate into the weld.

The shims 6 are held in position against the inner surface of the respective articles 1 prior to and during welding by an annular expansible segmental fixture shown schematically and indicated generally by 7. Radial expansion of fixtures 7 by the wedging action of annular wedges 8 which are located centrally of fixtures 7 and operated by rods 9 forces the respective shim 6 into tight bearing engagement with the inner surfaces of corresponding article 1. After the welding operation has been completed each fixture 7 can be conveniently contracted radially through operation of rods 9 and the fixture removed through the outer open end of the article.

In preparation for flash welding of articles 1, the shims 6 are initially positioned within the respective articles and forced against the inner surfaces thereof by expansion of the corresponding fixtures 7. The articles 1 are then clamped within electrodes 2.

The welding potential is applied to edges 3 through leads 5 and the electrodes 2 and the respective articles are moved toward each other until a flashing arc is set up by the current passing between the opposed edges 3. Continued movement of the articles toward each other is governed in accordance with the flashing off of the metal at the edges 3, and when a sufficient heating of metal immediately adjacent the edges is attained, the edges are abutted or bumped under pressure and the welding potential is discontinued. At the time of bumping of the opposed edges, the molten metal at the meeting faces of the edges is extruded laterally from the joint as flash metal, as shown in Fig. 3.

During the welding operation, the edge portions of the shims 6 adjacent the weld area are joined in the weld, so that after welding, the shims are retained in position within the articles without the necessity for fixture 7. Thus when fixtures 7 are removed from the articles after welding, the shims remain as welded to the inside surfaces of each article by the extruded flash.

The flash metal on the interior of the articles, indicated by 10, is then removed to a position flush with the exposed inner face of shims 6 by grinding, filing or chiseling. During this removal operation the shims serve to protect the inner surfaces of articles 1 surrounding the weld area so that the same are not damaged by the grinding, etc.

After the flash 10 has been removed to a position flush with the exposed face of shims 6, the shims fall out or can be easily knocked or pried loose as only the edge portion of the shims adjacent the weld are joined to the weld. The final flash removal is then accomplished.

As seen in Fig. 3, the thickness of shims 6 is considerably less than the depth of the extruded flash metal 10 so that the great majority of flash metal projects beyond the shims and may be removed by rough cutting while the shims are in place. Thus rough cutting tools, such as chisels and files, can be employed to remove the majority of the flash without danger of gouging the inner surface of the articles. After removal of the shims, fine cutting tools such as belt grinders or abrasive wheels can then be employed to remove the small remaining portion of the flash. As this invention permits the rough cutting tools to be employed to remove a greater portion of the flash than normal without marring the inner surface of the articles, a considerable time saving in flash removal results.

The present invention also provides a novel method of attaching the shims within the hollow articles. The shims are temporarily held in place by the expansible fixtures and are held in position after welding by the weld itself. It would be extremely difficult to tack weld the shims in position subsequent to the flash welding for the hollow interior of the articles is restricted in size and difficult of access. In addition, an independent support such as the fixture 7 cannot be used subsequent to welding to hold the shims in position, for the fixture would restrict or prevent the insertion and operation of the cutting tools within the welded article. Thus the present invention overcomes these difficulties and provides a simple and convenient method of securing the shims within hollow articles to accomplish flash removal therefrom.

Various modes of carrying out the invention are contemplated as within the scope of the following claims particularly pointing out and distinctly claiming the subject matter which is regarded as the invention.

I claim:

1. A method of making a hollow metal article, comprising spacing a pair of hollow members having opposed complementary edge portions in alignment for electrical flash welding, temporarily supporting a thin tubular metal shim against the inner surface of each member outwardly of the opposed edge portion thereof, applying an electrical potential to the members and moving the opposed edges into contact to flash weld the members together with the edge portion of each shim adjacent the welded joint being welded into said welded joint so that the majority of flash metal extruded within said members at the welded joint is disposed inwardly of the surface of the shim, rough cutting the flash metal to a level substantially flush with the exposed surface of said shims with said shims serving to protect the inner surfaces of the members from disfigurement during the rough cutting, removing the shims from within the members, and fine cutting the remaining flash metal to the level of the inner surfaces of the members.

2. A method of making a hollow metal article, comprising spacing a pair of hollow members having opposed complementary edge portions in alignment for electrical flash welding, disposing a metal band in contact with the inner surface of each of the hollow members by expansion of a supporting fixture removably disposed within said member, said bands being spaced from the opposed edge portion of the respective member and extending coextensively of the edge, applying an electrical potential to the members and moving the opposed edges into contact to flash weld the members together with the edge portion of each band adjacent the welded joint being joined in said welded joint, the bands being sufficiently thin so that the majority of inside flash metal is disposed inwardly of the surfaces of the bands, removing the supporting fixture from said members, rough cutting the flash metal extruded within said members at the welded joint to a level substantially flush with the exposed surfaces of said bands with said bands serving to protect the inner surfaces of the members from disfigurement during the rough cutting, removing the bands from the members, and fine cutting the remaining inner flash metal to the finished contour.

References Cited in the file of this patent

UNITED STATES PATENTS

| 1,939,772 | Greene | Dec. 19, 1933 |
| 1,995,546 | Meier | Mar. 26, 1935 |
| 2,241,216 | Phelps | May 6, 1941 |
| 2,258,913 | Stone | Oct. 14, 1941 |
| 2,399,815 | Martin | May 7, 1946 |
| 2,642,517 | Lindow | June 16, 1953 |

FOREIGN PATENTS

| 463,802 | Great Britain | Apr. 7, 1937 |